(12) United States Patent
Kim et al.

(10) Patent No.: US 11,384,755 B2
(45) Date of Patent: Jul. 12, 2022

(54) LINEAR COMPRESSOR AND METHOD FOR CONTROLLING LINEAR COMPRESSOR

(71) Applicant: LG Electronics Inc., Seoul (KR)

(72) Inventors: Heesun Kim, Seoul (KR); Youngdoo Kim, Seoul (KR); Jinseok Hu, Seoul (KR)

(73) Assignee: LG Electronics Inc., Seoul (KR)

( * ) Notice: Subject to any disclaimer, the term of this patent is extended or adjusted under 35 U.S.C. 154(b) by 283 days.

(21) Appl. No.: 16/671,823

(22) Filed: Nov. 1, 2019

(65) Prior Publication Data

US 2020/0240406 A1 Jul. 30, 2020

(30) Foreign Application Priority Data

Jan. 25, 2019 (KR) .................. 10-2019-0009891

(51) Int. Cl.
*F04B 49/12* (2006.01)
*H02K 41/02* (2006.01)
*F04B 35/04* (2006.01)

(52) U.S. Cl.
CPC ............ *F04B 49/12* (2013.01); *F04B 35/045* (2013.01); *H02K 41/02* (2013.01); *F04B 2203/0401* (2013.01)

(58) Field of Classification Search
CPC ............... F04B 35/045; F04B 49/12; F04B 2203/0401; H02K 1/02
See application file for complete search history.

(56) References Cited

U.S. PATENT DOCUMENTS

| | | | | |
|---|---|---|---|---|
| 6,715,301 | B2 * | 4/2004 | Song | F25B 1/02 |
| | | | | 62/6 |
| 7,033,141 | B2 * | 4/2006 | Hong | F04B 35/045 |
| | | | | 417/45 |
| 9,217,429 | B2 * | 12/2015 | Hu | F04B 35/04 |

(Continued)

FOREIGN PATENT DOCUMENTS

| | | |
|---|---|---|
| CN | 105890247 | 8/2016 |
| JP | H05164058 | 6/1993 |
| WO | WO2008139922 | 11/2008 |

OTHER PUBLICATIONS

European Office Action in European Application No. 19203024.5, dated Nov. 4, 2020, 7 pages.

(Continued)

*Primary Examiner* — Patrick Hamo
(74) *Attorney, Agent, or Firm* — Fish & Richardson P.C.

(57) ABSTRACT

A linear compressor includes a cylinder, a piston, a linear motor configured to drive the piston, a current detection unit configured to sense a current in the linear motor, a relay configured to change an operation mode of the linear motor, and a control unit configured to set at least one parameter for determining a stroke of the piston according to the operation mode. The control unit is configured to: determine a first magnitude of a first current in the linear motor based on a state of the relay being in a first state, determine a second magnitude of a second current in the linear motor based on the relay being switched to a second state from the first state, compare the first magnitude to the second magnitude, and based on the comparison of the first magnitude to the second magnitude, determine whether the relay fails to operate.

19 Claims, 3 Drawing Sheets

(56) References Cited

U.S. PATENT DOCUMENTS

| | | | |
|---|---|---|---|
| 9,618,004 B2 * | 4/2017 | Kim | F04D 27/00 |
| 10,587,211 B2 * | 3/2020 | Kusumba | H02P 6/34 |
| 10,935,020 B2 * | 3/2021 | Jung | F04B 49/065 |
| 2003/0177773 A1 | 9/2003 | Kim | |

OTHER PUBLICATIONS

Extended European Search Report in European Application No. 19203024.5, dated Dec. 18, 2019, 11 pages.

* cited by examiner

LINEAR COMPRESSOR AND METHOD FOR CONTROLLING LINEAR COMPRESSOR

CROSS-REFERENCE TO RELATED APPLICATION

Pursuant to 35 U.S.C. § 119(a), this application claims the benefit of earlier filing date and right of priority to Korean Application No. 10-2019-0009891, filed on Jan. 25, 2019, the contents of which are incorporated by reference herein in their entirety.

TECHNICAL FIELD

The present disclosure relates to a linear compressor and a control method thereof, and more particularly, to a linear compressor that controls the movement of a piston without a separate sensor and a control method thereof.

BACKGROUND

A compressor is an apparatus that can convert mechanical energy into compressive energy of a compressible fluid and may be used as a part of a refrigeration apparatus such as a refrigerator or an air conditioner.

In some case, compressors may be categorized into reciprocating compressors, rotary compressors, and scroll compressors. The reciprocating compressor may have a compression space formed between a piston and a cylinder to suction or discharge a working gas to thereby compress refrigerant by the piston linearly reciprocating inside the cylinder. The rotary compressor may have a compression space formed between a cylinder and an eccentrically rotating roller to suction or discharge a working gas to thereby compress refrigerant by the roller eccentrically rotating along an inner wall of the cylinder. The scroll compressor may have a compression space formed between an orbiting scroll and a fixed scroll to suction or discharge a working gas to thereby compress refrigerant by the orbiting scroll rotating along with the fixed scroll.

A reciprocating compressor may suction, compress, and discharge a refrigerant gas by an inner piston linearly reciprocating inside a cylinder. In some cases, reciprocating compressors may be classified into a recipro-type compressor and a linear-type compressor according to a piston driving scheme.

A recipro-type compressor may include a crankshaft that is coupled to a rotating motor and a piston that is coupled to the crankshaft to convert a rotational movement of the motor into a linearly reciprocating movement. A linear-type compressor may include a piston that is connected to a linearly moving mover of a motor to convert a linear movement of the motor into a reciprocating movement of the piston.

In some examples, the reciprocating compressors may include an electric power unit for generating a driving force and a compression unit for receiving the driving force from the power unit and compressing a fluid. For instance, a motor may be used as the electric power unit, and a linear motor may be used for the linear compressor.

A linear motor may generate a linear driving force, and may not include mechanical conversion device and thus have a less complex structure. In some cases, a linear motor can reduce loss due to energy conversion and can reduce noise due to friction and abrasion. In some examples, when a linear-type reciprocating compressor (hereinafter referred to as a linear compressor) is used in a refrigerator or air conditioner, a compression ratio may be changed by changing a stroke voltage applied to the linear compressor, which allows the linear compressor to be used for variable freezing capacity control.

In some cases, the linear compressor may operate in a first mode in which power is increased or in a second mode in which power consumption is reduced depending on an operating state of a relay provided therein. The linear compressor that is set to the first mode and the linear compressor that is set to the second mode may have different inductance values.

Accordingly, the control unit of the linear compressor may control the operation of the compressor using different parameters according to the set mode.

In this case, when a failure occurs in the relay provided in the compressor, the control unit cannot accurately control the operation of the linear compressor. For example, the control unit may control the operation of the compressor by using parameters corresponding to the second mode although a failure occurred in the relay and the switching from the first mode to the second mode was not performed. In this case, a stroke estimate, a phase difference between stroke and current, and the like may not be accurately computed.

Accordingly, when a linear compressor has operation modes switched by the relay operation, it is of interest to diagnose whether or not the relay operates normally and determine control parameters according to the diagnosis result.

SUMMARY

The present disclosure provides a linear compressor that can monitor whether a failure has occurred in the relay provided in the linear compressor and a control method thereof.

The present disclosure also provides a linear compressor that can accurately control the operation of the linear compressor even when a relay provided in the linear compressor fails to operate, and a control method thereof.

According to one aspect of the subject matter described in this application, a linear compressor includes: a cylinder that defines a compression space; a piston configured to move in the cylinder; a linear motor configured to drive the piston; a current detection unit configured to sense a current in the linear motor; a relay configured to change an operation mode of the linear motor; and a control unit configured to set at least one parameter for determining a stroke of the piston according to the operation mode. The control unit is configured to: determine a first magnitude of a first current in the linear motor based on a state of the relay being in a first state, determine a second magnitude of a second current in the linear motor based on the state of the relay being in a second state switched from the first state, compare the first magnitude to the second magnitude, and based on the comparison of the first magnitude to the second magnitude, determine whether the relay fails to operate.

Implementations according to this aspect may include one or more of the following features. For example, the control unit may be further configured to: determine a ratio between the first magnitude and the second magnitude; and based on the ratio being in a preset range, determine that the relay fails to operate. In some examples, the control unit may be further configured to reset the at least one parameter based on a determination that the relay fails to operate. In some examples, the control unit may be further configured to maintain an operation condition of the linear motor while determining the first magnitude of the first current and the second magnitude of the second current.

In some implementations, the control unit may be further configured to: apply a power setpoint to the linear motor while determining the first magnitude of the first current corresponding to the power setpoint applied to the linear motor, and maintain the power setpoint while determining the second magnitude of the second current. In some examples, the preset range may be set based on a constant associated with the linear motor.

In some implementations, the control unit may be further configured to determine a variation of the second current with respect to the first current, and based on the variation, determine whether the relay fails to operate. In some examples, the control unit may be further configured to determine that the relay operates in a normal state based on the ratio being outside of the preset range.

In some implementations, the linear compressor may further include an inductor having an inductance value that varies based on the state of the relay. In some implementations, the linear compressor may further include an inverter configured to supply power to the linear motor, the inverter comprising a plurality of switching elements, where the inductor is connected between the plurality of switching elements.

In some examples, the inductor may have a first end connected to a first node between the plurality of switching elements, and a second end configured to connect to a first end of the relay. In some examples, a second end of the relay is connected to a second node between the plurality of switching elements. In some examples, the inductor may include a plurality of inductors, and the relay may be configured to connect to one of the second end of the inductor or a third node between the plurality of inductors.

In some implementations, the plurality of switching elements may include a first pair of switching elements connected to each other electrically in series and a second pair of switching elements connected to each other electrically in series, where the first pair of switching elements are connected to the second pair of switching elements electrically in parallel, and the first node is disposed between the first pair of switching elements, and the second node is disposed between the second pair of switching elements.

In some examples, the inductor and the relay may be disposed between the first node and the second node. In some examples, the operation condition of the linear motor may include a power set point applied to the linear motor, and the control unit may be further configured to maintain the power set point applied to the linear motor while determining the first magnitude of the first current and the second magnitude of the second current.

According to another aspect, a refrigerator includes a linear compressor that includes a cylinder that defines a compression space, a piston configured to move in the cylinder, a linear motor configured to drive the piston, a current detection unit configured to sense a current in the linear motor, a relay configured to change an operation mode of the linear motor, and a control unit configured to set at least one parameter for determining a stroke of the piston according to the operation mode. The control unit is configured to: determine a first magnitude of a first current in the linear motor based on a state of the relay being in a first state, determine a second magnitude of a second current in the linear motor based on the state of the relay being in a second state switched from the first state, compare the first magnitude to the second magnitude, and based on the comparison of the first magnitude to the second magnitude, determine whether the relay fails to operate.

Implementations according to this aspect may include one or more of the following features or one or more the features described above. For example, the control unit may be further configured to: determine a ratio between the first magnitude and the second magnitude; and based on the ratio being in a preset range, determine that the relay fails to operate.

According to another aspect, a refrigerator includes a linear compressor and a refrigerator control unit configured to generate a mode switching signal configured to switch an operation mode of the linear compressor. The linear compressor includes a cylinder that defines a compression space, a piston configured to move in the cylinder, a linear motor configured to drive the piston, a current detection unit configured to sense a current in the linear motor, a relay configured to change an operation mode of the linear motor based on the mode switching signal, and a compressor control unit configured to set at least one parameter for determining a stroke of the piston according to the operation mode. The compressor control unit is configured to: determine a first magnitude of a first current in the linear motor based on a state of the relay being in a first state, determine a second magnitude of a second current in the linear motor based on the state of the relay being in a second state switched from the first state, compare the first magnitude to the second magnitude, and based on the comparison of the first magnitude to the second magnitude, determine whether the relay fails to operate.

Implementations according to this aspect may include one or more of the following features or one or more the features described above. For example, the compressor control unit may be further configured to, based on the mode switching signal, determine a ratio between the first magnitude and the second magnitude, and based on the ratio being in a preset range, determine that the relay fails to operate.

In some implementations, a user may check whether the relay fails to operate, and thus it may be possible to prevent or reduce an unnecessary increase in repair cost.

In some implementations, it may be possible to accurately compute the stroke of the linear compressor or the phase difference between the stroke and the motor current even when the relay fails to operate.

DETAILED DESCRIPTION

The present disclosure described herein may be applied to a device and a method for controlling a linear compressor. However, the disclosure described herein is not limited thereto, but may be applied to control devices, control methods, motor control devices, motor control methods, motor noise test devices, and motor noise test methods for many types of compressors to which the technical spirit of the present disclosure is applicable.

Also, in the description of the technology disclosed in this specification, a detailed description of related arts will be omitted when it is determined that the description may obscure the gist of the technology disclosed in this specification. Also, it should be noted that the accompanying drawings are merely illustrated to easily understand the technical spirit disclosed in the specification, and therefore, they should not be construed to limit the technical spirit disclosed in the specification.

The following description describes the configuration and corresponding effects of the present disclosure.

An implementation associated with elements of a linear compressor will be described below with reference to FIG. 1.

Figure 1:
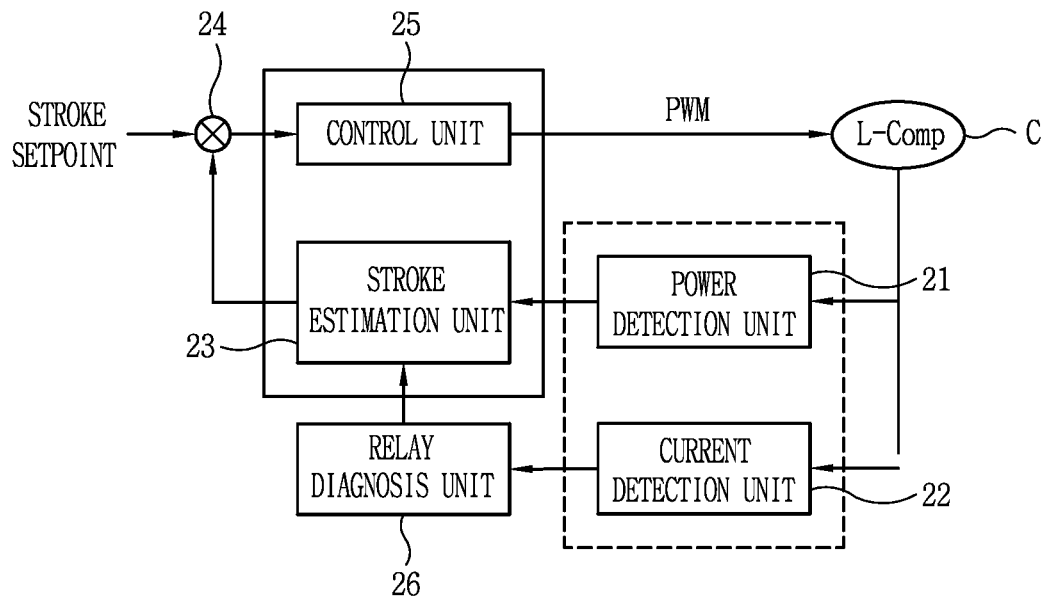
FIG. 1 is a conceptual view showing an example of a compressor failure diagnosis apparatus.

FIG. 1 is a block diagram showing an example of a configuration of a control device of a reciprocating compressor.

As shown in FIG. 1, the control device of the reciprocating compressor may include a sensing unit configured to sense a motor voltage and a motor current associated with a motor.

In some implementations, referring to FIG. 1, the sensing unit may include a power or voltage detection unit 21 configured to detect a motor voltage applied to a motor and a current detection unit 22 configured to detect a motor current applied to the motor. The voltage detection unit 21 and the current detection unit 22 may deliver information associated with the detected motor voltage and motor current to a control unit 25, a stroke estimation unit 23, or both.

In some implementations, as shown in FIG. 1, the compressor or the control device of the compressor may include the stroke estimation unit 23 configured to estimate a stroke on the basis of the detected motor current and motor voltage, and the motor parameters, a comparator 24 configured to compare the stroke estimate and a stroke setpoint, and the control unit 25 configured to change the voltage applied to the motor to control the stroke. In some cases, one component shown in FIG. 1 may include one or more of the other components shown in FIG. 1. For instance, the control unit 25 may include the stroke estimation unit 23. In some examples, the control unit 25 and the stroke estimation unit 23 may be provided to the compressor as individual components.

In some implementations, a compressor control device may not include all of the components shown in FIG. 1. In some implementations, a compressor control device may include more or fewer components than the example control device shown in FIG. 1.

In some implementations, the compressor control device is allocable to the reciprocating compressor, but the following description will be based on the linear compressor.

In some implementations, the control unit 25 of the linear compressor may be present separately from a refrigerator control unit mounted on a refrigerator to control the operation of the refrigerator. Accordingly, the control unit 25 of the linear compressor may be defined as a compressor control unit.

The components thereof will be described below.

The voltage detection unit 21 is configured to detect the motor voltage applied to the compressor motor. In some implementations, the voltage detection unit 21 may include a rectification part and a direct current (DC) link part. The rectification part may rectify alternating current (AC) power having a voltage of a predetermined magnitude and output a DC voltage. In some examples, the DC link part 12 may include two capacitors.

The current detection unit 22 may be configured to detect the motor current applied to the motor. In some cases, the current detection unit 22 may sense a current flowing a coil of the compressor motor.

The stroke estimation unit 23 may compute the stroke estimate using the detected motor current and motor voltage and the motor parameters and apply the computed stroke estimate to the comparator 24.

In some implementations, the stroke estimation unit 23 may compute the stroke estimate using Equation 1 below:

$$x = \frac{1}{\alpha} \int \left( V_m - Ri_m - L\frac{di_m}{dt} \right) dt, \qquad \text{<Equation 1>}$$

where x denotes a stroke, α denotes a motor constant or a counter electromotive force, $V_m$ denotes a motor voltage, $i_m$ denotes a motor current, R denotes a resistance, and L denotes an inductance.

In some implementations, the comparator 24 may compare the stroke estimate and the stroke setpoint and apply a difference signal thereof to the control unit 25. Then, the control unit 25 may control the stroke by changing the voltage applied to the motor.

For example, the control unit 25 may decrease the applied motor voltage when the stroke estimate is larger than the stroke setpoint, and may increase the applied motor voltage when the stroke estimate is smaller than the stroke setpoint.

The relay diagnosis unit 26 may determine whether the operation of the relay is normal. A method of determining whether the operation of the relay is normal will be described below with reference to FIG. 3.

Figure 2:
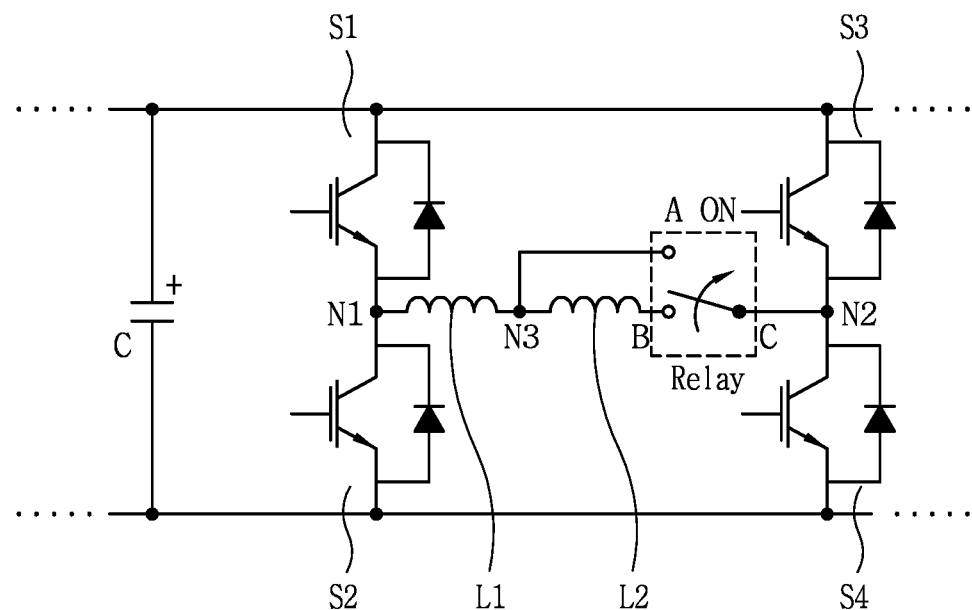
FIG. 2 is a circuit diagram showing an example of a motor circuit of a compressor to be diagnosed.

Referring to FIG. 2, the relay provided in the compressor and a circuit configuration near the relay are shown.

As shown in FIG. 2, the motor of the compressor is supplied with power by an inverter including a plurality of switching elements S1, S2, S3, and S4. In this case, the relay, a first inductor L1, and a second inductor L2 area provided between a first node which is a contact point between the first switch S1 and the second switch S2, and a second node N2, which is a contact point between the third switch S3 and the fourth switch S4.

In some examples, the plurality of switching elements may include a first pair of switching elements S1 and S2 that are connected to each other electrically in series and a second pair of switching elements S3 and S4 that are connected to each other electrically in series. The first pair of switching elements S1 and S2 may be connected to the second pair of switching elements S3 and S4 electrically in parallel. In these examples, the first node N1 is disposed between the first pair of switching elements S1 and S2, and the second node N2 is disposed between the second pair of switching elements S3 and S4. Additionally, the inductor has a first end connected to the first node and a second end configured to connect to a first end of the relay. The first end of the relay may be configured to connect to point A or point B. A second end C of the relay is connected to the second node N2 between the second pair of switching elements S3 and S4.

In some examples, the inductor may include a plurality of inductors L1 and L2, and the relay may be configured to connect to one of point B or point A that is connected to a third node N3 between the plurality of inductors L1 and L2.

In some examples, where the linear compressor shown in FIG. 2 is installed in the refrigerator, the control device of the refrigerator may generate a switching signal for switching the operation mode of the linear compressor as necessary.

In some examples, when the refrigerator requires larger cooling power, the control device of the refrigerator may generate the switching signal such that the relay of the linear compressor is connected to point A. In this case, the inductance formed between the compressor and the switch may correspond to the inductance value of the first inductor L1. Hereinafter, a state in which the relay is connected to point A is defined as a first operation mode of the linear compressor.

In a normal case, the control device of the refrigerator may generate the switching signal such that the relay of the linear compressor is connected to point B. In this case, the inductance formed between the compressor and the switch may correspond to the inductance values of the first inductor L1 and the second inductor L2. Hereinafter, a state in which the relay is connected to point B is defined as a first operation mode of the linear compressor. In some examples, the linear compressor may inductors L1 and L2, each of which may have a value that varies depending on the state of the relay. In addition, the linear compressor may include an inverter having a plurality of switching elements S1 to S4 to supply power to the linear motor. In this regard, the inductors L1 and L2 are connected between the switching elements S1 to S4. The relay and the inductors L1 and L2 are disposed between the switching elements S1 to S4. For instance, the relay and the inductors L1 and L2 may be disposed between the first node N1 and the second node N2.

A method of determining whether the relay shown in FIG. 2 fails will be described in detail below with reference to FIG. 3.

Figure 3:
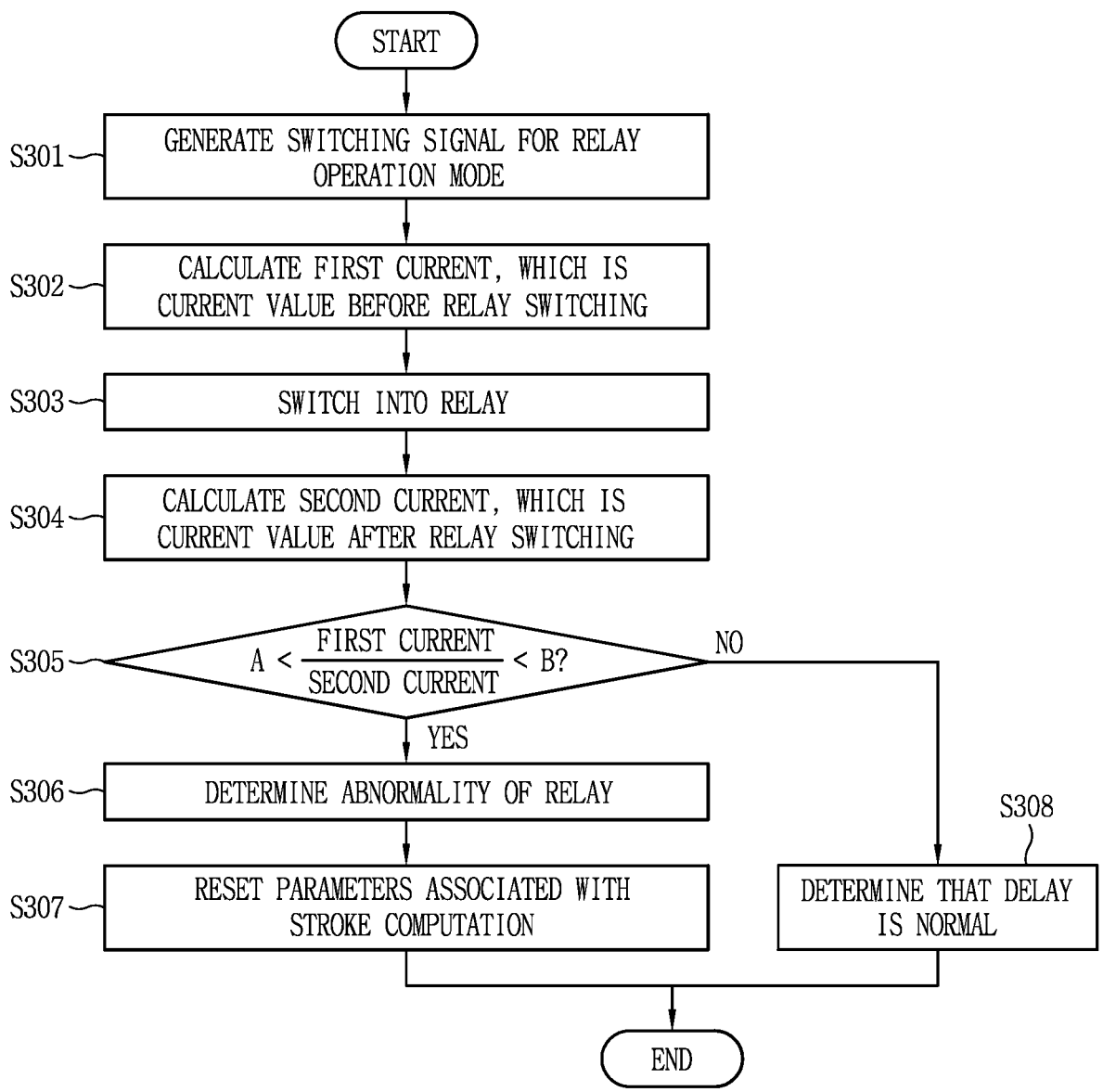
FIG. 3 is a flow chart showing an example process of comparing an electric current flowing in a main winding of the motor and an electric current flowing in an auxiliary winding.

In the method illustrated in FIG. 3, a switching signal for a relay operation mode may be generated (S301). For example, a switching signal for changing the operation mode of the linear compressor may be generated. The switching signal may be generated by a control device of an electronic device having the compressor or by a mechanical switch provided in the linear compressor.

When the switching signal is generated, the control unit 25 may calculate the magnitude of a first current, which is a current value before the relay is switched (S302).

When the magnitude of the first current is calculated, the control unit 25 may switch the operation mode of the relay (S303). In some implementations, the control unit 25 may operate a linear motor under the same condition while calculating the magnitude of the first current and the magnitude of the second current. In some examples, the control unit 25 may control a power setpoint applied to the linear motor while the control unit calculates the magnitude of the first current corresponds to the power setpoint applied to the linear motor and while the control unit calculates the magnitude of the second current.

The control unit 25 may calculate the magnitude of a second current, which is a current value after the operation mode of the relay is switched (S304).

In some implementations, the control unit 25 may determine whether a ratio between the magnitude of the first current and the magnitude of the second current is in a previously set or preset range (S305). In this regard, the range is set based on a constant associated with the linear motor. For example, a preset range associated with a first linear motor may be different from a preset range associated with a second linear motor that is different from the first linear motor. The preset range may include a lower bound "A" and an upper bound "B," and the control unit 25 may compare the ratio to the lower bound A and the upper bound B to determine whether the ratio is within the preset range between the lower bound A and the upper bound B.

When the ratio between the magnitude of the first current and the magnitude of the second current is in the preset range, the control unit 25 may determine that a failure has occurred in the relay (S306) and then may reset parameters associated with the stroke computation (S307). In some implementations, the control unit 25 may calculate a variation of the second current with respect to the first current and determine whether the relay fails based on the calculated variation.

In some examples, when the ratio between the magnitude of the first current and the magnitude of the second current is not in the preset range, the control unit may determine that the relay is normal (S308).

Figure 4:
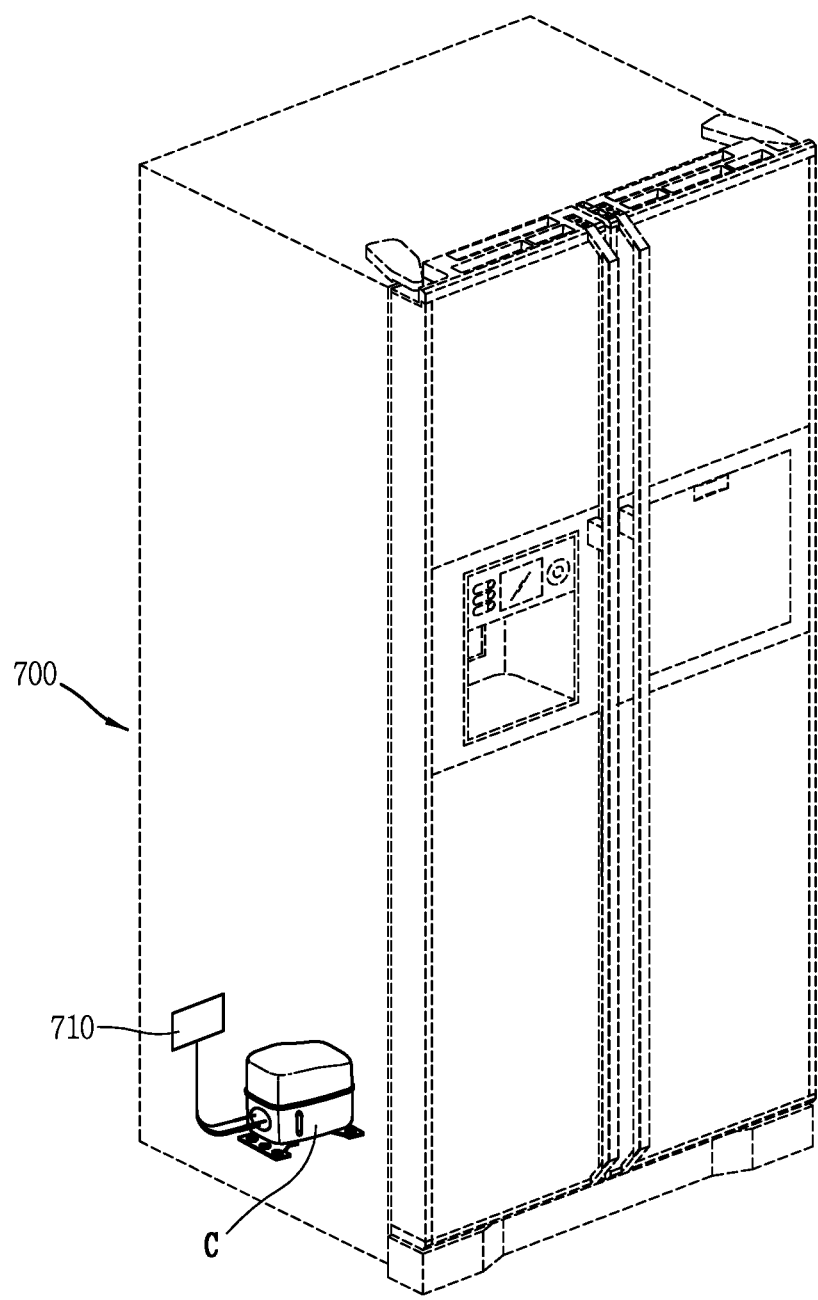
FIG. 4 is a conceptual view showing an example of a refrigerator having a linear compressor.

Referring to FIG. 4, a refrigerator 700 having the linear compressor is shown. The refrigerator 700 may include a linear compressor 11 and a refrigerator control unit 710, and the refrigerator control unit 710 may generate a mode switching signal for switching the operation mode of the linear compressor. Referring to FIGS. 1 and 4, the linear compressor 11 may comprise a cylinder configured to form a compression space, a piston configured to move in the cylinder, a linear motor configured to drive the piston, and a current detection unit 22 configured to sense a current flowing in the linear motor. Referring to FIGS. 2 and 4, the linear compressor 11 may further comprise a relay configured to change an operation mode of the linear motor when the mode switching signal is generated by the refrigerator control unit 710.

In detail, the refrigerator control unit 710 periodically detects a change in load of the refrigerator. When a load variation is greater than or equal to a reference, the refrigerator control unit 710 may generate a mode switching signal such that the relay included in the linear compressor is connected to point A. Also, when there is a need to increase a cooling force of the refrigerator, the refrigerator control unit 710 may generate a mode switching signal such that the relay included in the linear compressor is connected to point A.

In some implementations, the refrigerator control unit 710 may generate a mode switching signal such that the relay included in the linear compressor is connected to point B under general driving conditions.

In some implementations, the refrigerator control unit may communicate with the compressor control unit (or the control unit 25) and may receive, from the compressor control unit, information regarding whether the relay included in the linear compressor fails. In some examples, with the compressor control unit 25 may be configured to set at least one parameter for computing a stroke of the piston according to the operation mode changed by the relay. In addition, the compressor control unit 25 may calculate a magnitude of a first current, which is a current flowing in the linear motor before the state of the relay is switched, calculate a magnitude of a second current, which is a current flowing in the linear motor after the state of the relay is switched, and compare the magnitude of the first current and the magnitude of the second current to determine whether the relay fails. In some implementations, when the mode switching signal is generated by the refrigerator control unit 710, the compressor control unit 25 may calculate a ratio between the first current and the second current and determines that the relay fails when the calculated ratio is in a preset range.

In some implementations, the refrigerator may include an output unit such as a display and a communication unit such as a WiFi module. Accordingly, the refrigerator control unit may output the information regarding whether the relay fails, which is received from the compressor control unit, to the display of the refrigerator or may transmit the information to a user terminal by means of the communication unit.

In some implementations, a user may check whether the relay fails, and thus it may be possible to prevent or reduce an unnecessary increase in repair cost.

In some implementations, it may be possible to accurately compute the stroke of the linear compressor or the phase difference between the stroke and the motor current even when the relay fails.

What is claimed is:

1. A linear compressor comprising:
    a cylinder that defines a compression space;
    a piston configured to move in the cylinder;
    a linear motor configured to drive the piston;
    a current detection unit configured to sense a current in the linear motor;
    a relay configured to change an operation mode of the linear motor; and
    a control unit configured to set at least one parameter for determining a stroke of the piston according to the operation mode,
    wherein the control unit is configured to:
        determine a first magnitude of a first current in the linear motor based on a state of the relay being in a first state,
        determine a second magnitude of a second current in the linear motor based on the state of the relay being in a second state switched from the first state,
        compare the first magnitude to the second magnitude,
        determine a ratio between the first magnitude and the second magnitude, and
        based on the ratio, determine whether the relay fails to operate.

2. The linear compressor of claim 1, wherein the control unit is further configured to,
    based on the ratio being in a preset range, determine that the relay fails to operate.

3. The linear compressor of claim 2, wherein the control unit is further configured to:
    reset the at least one parameter based on a determination that the relay fails to operate.

4. The linear compressor of claim 2, wherein the control unit is further configured to:
    maintain an operation condition of the linear motor while determining the first magnitude of the first current and the second magnitude of the second current.

5. The linear compressor of claim 3, wherein the control unit is further configured to:
    apply a power setpoint to the linear motor while determining the first magnitude of the first current corresponding to the power setpoint applied to the linear motor, and
    maintain the power setpoint while determining the second magnitude of the second current.

6. The linear compressor of claim 2, wherein the preset range is set based on a constant associated with the linear motor.

7. The linear compressor of claim 1, wherein the control unit is further configured to:
    determine a variation of the second current with respect to the first current; and
    based on the variation, determine whether the relay fails to operate.

8. The linear compressor of claim 2, wherein the control unit is further configured to:
    determine that the relay operates in a normal state based on the ratio being outside of the preset range.

9. The linear compressor of claim 1, further comprising:
    an inductor having an inductance value that varies based on the state of the relay.

10. The linear compressor of claim 9, further comprising:
    an inverter configured to supply power to the linear motor, the inverter comprising a plurality of switching elements,
    wherein the inductor is connected between the plurality of switching elements.

11. The linear compressor of claim 10, wherein the inductor has:
    a first end connected to a first node between the plurality of switching elements; and
    a second end configured to connect to a first end of the relay.

12. The linear compressor of claim 11, wherein a second end of the relay is connected to a second node between the plurality of switching elements.

13. The linear compressor of claim 12, wherein the inductor comprises a plurality of inductors, and
    wherein the relay is configured to connect to one of the second end of the inductor or a third node between the plurality of inductors.

14. The linear compressor of claim 12, wherein the plurality of switching elements comprise a first pair of switching elements connected to each other electrically in series and a second pair of switching elements connected to each other electrically in series,
    wherein the first pair of switching elements are connected to the second pair of switching elements electrically in parallel, and
    wherein the first node is disposed between the first pair of switching elements, and the second node is disposed between the second pair of switching elements.

15. The linear compressor of claim 14, wherein the inductor and the relay are disposed between the first node and the second node.

16. The linear compressor of claim 4, wherein the operation condition of the linear motor comprises a power set point applied to the linear motor, and
    wherein the control unit is further configured to maintain the power set point applied to the linear motor while determining the first magnitude of the first current and the second magnitude of the second current.

17. A refrigerator comprising a linear compressor,
    wherein the linear compressor comprises:
        a cylinder that defines a compression space,
        a piston configured to move in the cylinder,
        a linear motor configured to drive the piston,
        a current detection unit configured to sense a current in the linear motor,
        a relay configured to change an operation mode of the linear motor, and
        a control unit configured to set at least one parameter for determining a stroke of the piston according to the operation mode, and wherein the control unit is configured to:
  determine a first magnitude of a first current in the linear motor based on a state of the relay being in a first state,
  determine a second magnitude of a second current in the linear motor based on the state of the relay being in a second state switched from the first state,
  compare the first magnitude to the second magnitude,
  determine a ratio between the first magnitude and the second magnitude, and
  based on the ratio being in a preset range, determine that the relay fails to operate.

18. A refrigerator comprising:
a linear compressor; and
a refrigerator control unit configured to generate a mode switching signal configured to switch an operation mode of the linear compressor,
wherein the linear compressor comprises:
  a cylinder that defines a compression space,
  a piston configured to move in the cylinder,
  a linear motor configured to drive the piston,
  a current detection unit configured to sense a current in the linear motor,
  a relay configured to change an operation mode of the linear motor based on the mode switching signal, and
  a compressor control unit configured to set at least one parameter for determining a stroke of the piston according to the operation mode, and
wherein the compressor control unit is configured to:
  determine a first magnitude of a first current in the linear motor based on a state of the relay being in a first state,
  determine a second magnitude of a second current in the linear motor based on the state of the relay being in a second state switched from the first state,
  compare the first magnitude to the second magnitude,
  determine a variation of the second current with respect to the first current,
  based on the variation, determine whether the relay fails to operate, and
  determine that the relay operates in a normal state based on the variation being outside of a preset reference.

19. The refrigerator of claim 18, wherein the compressor control unit is further configured to:
  based on the mode switching signal, determine a ratio between the first magnitude and the second magnitude; and
  based on the ratio being in a preset range, determine that the relay fails to operate.

\* \* \* \* \*